United States Patent [19]

Woolcott

[11] Patent Number: 4,849,604

[45] Date of Patent: Jul. 18, 1989

[54] HEATING DEVICE FOR AIR INLET MANIFOLDS

[75] Inventor: Peter J. Woolcott, Wokingham, England

[73] Assignee: Lucas Industries Public Limited Company, Birmingham, England

[21] Appl. No.: 113,679

[22] Filed: Oct. 27, 1987

[30] Foreign Application Priority Data

Nov. 15, 1986 [GB] United Kingdom ................. 8627383

[51] Int. Cl.[4] ........................ F02N 17/00; B60L 1/02; F23D 11/44; F23Q 7/08

[52] U.S. Cl. .................................... 219/207; 219/205; 219/206; 123/549; 123/557; 123/558; 123/179 H; 431/208; 431/262

[58] Field of Search ............... 219/205, 206, 207, 271, 219/273; 123/179 H, 179 R, 179 G, 180 R, 180 E, 549, 557, 558; 431/208, 209, 262

[56] References Cited

U.S. PATENT DOCUMENTS

| | | | |
|---|---|---|---|
| 3,178,149 | 6/1962 | Curzon | 219/273 |
| 3,400,699 | 9/1968 | Van Kirk | 123/550 |
| 4,380,218 | 4/1983 | Munro | 431/208 |
| 4,648,361 | 3/1987 | Hales | 123/550 |

*Primary Examiner*—E. A. Goldberg
*Assistant Examiner*—Scott A. Rogers
*Attorney, Agent, or Firm*—Balogh, Osann, Kramer, Dvorak, Genova & Traub

[57] ABSTRACT

A heating device for mounting on an air inlet manifold of a compression ignition engine to heat the air flowing to the engine comprises a thin walled tubular element closed at one end and having a fuel inlet at the other end. A ceramic plug is located in the element to direct fuel flow against the interior surface of the element. A heating element is wound about the tubular element to heat and vaporize the fuel which flows out through an opening adjacent the one end. The fuel vapor forms an air/fuel mixture which is ignited by an ignition element.

7 Claims, 1 Drawing Sheet

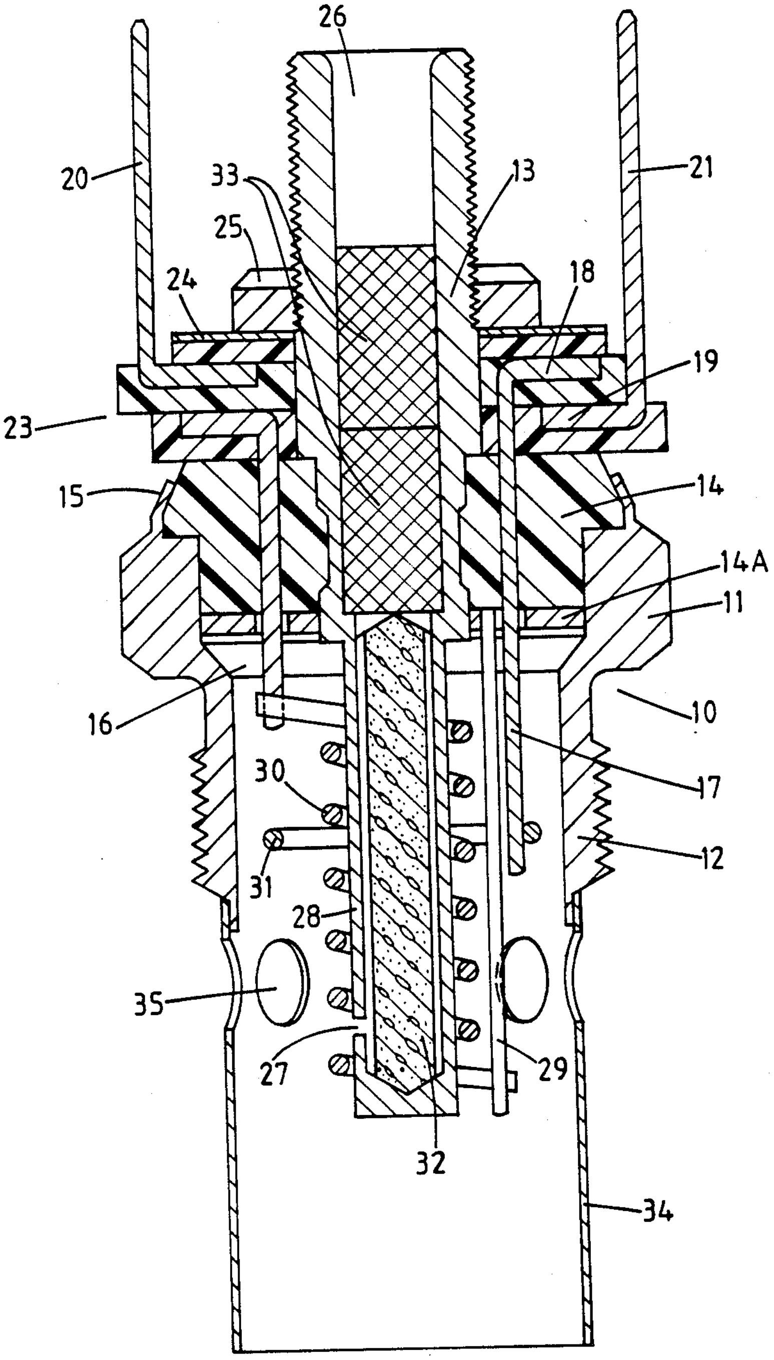
26
20
33
13
21
25
24
18
19
23
15
14
14A
11
10
16
17
30
12
31
28
35
27
29
32
34

HEATING DEVICE FOR AIR INLET MANIFOLDS

This invention relates to a heating device for mounting on an air inlet manifold of a compression ignition engine and of the kind in which liquid fuel is heated and vaporized to form an air/fuel mixture which is ignited to provide a flame which heats the air flowing to the engine.

The object of the present invention is to provide a heating device of the kind specified in a simple and convenient form.

According to the invention a device for the purpose specified comprises a thin walled tubular element, one end of said element being closed and the other end of the element being connected in use to a source of liquid fuel, an aperture formed in the wall of the element adjacent said one end thereof, an electric heating element wound about the tubular element, said element in use acting to heat the tubular element so that the fuel therein is vaporized, the vaporized fuel passing through said aperture and forming an air/fuel mixture, an ignition element for igniting said mixture and a plug located within the portion of the tubular element said plug being shaped to allow fuel flow to said aperture and to direct the fuel against the inner surface of the wall of the tubular element.

The accompanying drawing is a sectional side elevation of the heating device and it will be seen to comprise a hollow body 10 which in the example is formed from metal, the body having a hexagonal portion 11 and an annular portion 12 the periphery of which is provided with a screw thread for engagement in use in a mounting on the engine inlet manifold. Also provided is a tubular element 13 which is of stepped cylindrical form and which is formed from stainless steel. The element is retained relative to the body by an electrically insulating and heat resisting moulding 14 which is moulded about the intermediate portion of the element. The moulding is shaped to locate against a step defined in the body and is retained therein by rolling over a thin section portion 15 of the body. A heat shield 14A is located against the end face of the moulding which is within the body, the heat shield being formed from metal or from some suitable ceramic material.

The moulding 14 is formed with elongated openings through which extend a pair of conductive members 16, 17 which extend within the space defined between the inner portion of the element 13 and the body 10. The conductive members are integrally formed with washers 18, 19 and terminal members 20, 21 respectively. The washers are incorporated into a moulded terminal assembly 23 which maintains the washers in spaced insulating relationship and which is provided with a central aperture which can locate about an unthreaded portion of the element 13. The terminal assembly is retained in position by means of a bolt threaded nut 25 which is engaged with a threaded portion of the element 13, a metallic washer 24 being positioned between the nut and the terminal assembly.

The threaded end of the tubular element forms a fuel inlet 26 for connection in use to a source of fuel under pressure and the opposite end portion 28 of the tubular element projects beyond the end of the body 10 and is of reduced diameter and also has a wall thickness of approximately 0.254 mm. Moreover, the end of the element is closed and at least one aperture 27 is formed adjacent the closed end of the element. In the example two apertures are provided having a diameter of 1.0 mm.

The outer surface of the portion 28 of the element is coated with an electrically insulating frit and wrapped tightly around the outer surface is a heating element 30 formed from wire. One end of the element is secured, as by welding, to the conductive member 16 and the other end of the element is secured to an intermediate conductive member 29 which is supported by the moulding 14 being a force fit therein. Conveniently the material forming the wire is NICHROME.

The conductive member 29 is also connected to one end of a single turn ignition element 31 which is formed from the same section wire as the heating element. The other end of the ignition element is connected to the conductive member 17. The ignition element is spaced outwardly from the heating element and is located about halfway between the apertures 27 and the shield 14A.

Within the end portion 28 of the element 13 there is located a plug 32 which conveniently is formed from ceramic material and which is so constructed as to permit fuel to flow to the aperture or apertures 27. The plug may be fluted and its ends chamfered. Also located in the bore in the element 13 is a porous plug or plugs 33. The plugs are located in end to end relationship and the purpose of the plugs is to filter the fuel flowing through the inlet 26 on its way to the apertures 27 and also to control the flow of fuel. The plug or plugs are formed from sintered bronze material a convenient material being manufactured by Bound Brook Green Limited and sold under the designation F366-100B LUBROOK.

The heating device is also provided with a tubular thin walled shroud 34 which is secured to the end of the annular portion 12 of the body as by welding and adjacent the end of the body the shroud is provided with a plurality of openings 35 through which, in use, air can enter into the annular space between the element and the shroud. The shroud extends beyond the closed end of the element 13.

In use when the terminal members 20, 21 are connected to a source of electric supply, the heating element will rapidly heat the thin walled end portion 28 of the element 13 and fuel supplied through the inlet 26 will be vaporized during its passage to the apertures 27. The fuel vapour emerging from the apertures 27 is mixed with air flowing through the openings 35 and the resultant mixture is ignited by the ignition element 31. A flame is therefore produced which heats the air flowing in the inlet manifold.

It will be noted that the ignition element 31 is spaced from the openings 27. The purpose of this is to protect the ignition element from the intense heat produced when the fuel is burnt. It has been found that ignition of the air/fuel mixture can be attained in a satisfactory manner with the ignition element positioned as shown. The plug or plugs 33 control the rate of fuel flow through the device in an extremely convenient manner and also act to retain any particles of dirt which might otherwise tend to block the apertures 27. The thin walled section of the end portion 28 of the element 13 ensures that a flame is achieved very quickly after switching on the electric supply and supplying fuel through the inlet 26.

I claim:

1. A heating device for mounting on an air inlet manifold on a compression ignition engine, comprising a thin walled tubular element, one end of said element being closed and the other end of said element being connected in use to a source of liquid fuel, an aperture formed in the wall of said element adjacent said one end thereof, an electric heating element wound about said tubular element, said heating element in use acting to heat said tubular element so that fuel therein is vaporized, with vaporized fuel passing through said aperture forming an air/fuel mixture, an ignition element for igniting said mixture and a plug located within said tubular element, said plug being shaped to allow fuel flow to said aperture and to direct the fuel along an inner surface of said tubular element, a hollow body, means mounting said tubular element within said body, said body defining an annular portion extending about said tubular element, a hollow shroud secured to said annular portion of said body and extending beyond said one end of said tubular element, openings formed in said shroud through which air can flow to form an air/fuel mixture, said ignition element being substantially removed from said aperture in a position between said aperture and said other end of said tubular element.

2. A device according to claim 1 including a further plug located in said tubular element, said further plug being porous so as to act as a filter and to control the rate of fuel flow through the tubular element.

3. A device according to claim 2 in which said first mentioned plug is formed from ceramic material and said further plug is formed from sintered metal.

4. A device according to claim 2 in which said means comprises a heat resisting moulding which is moulded about an intermediate portion of the tubular element and is retained against a step in the body by rolling a thin section of the body.

5. A device according to claim 4 including a heat shield disposed against the end face of the moulding facing towards said one end of the tubular element.

6. A device according to claim 2 in which the tubular element is formed from metal and is coated with an electrically insulating frit over at least that portion about which the heating element is wound, the heating element being formed from round section wire.

7. A device according to claim 1 in which the tubular element is formed from stainless steel and the wall thickness of that portion of the element which is surrounded by the heating element is approximately 0.254 mm, the diameter of said aperture being 1.0 mm.

* * * * *